United States Patent
Clark

(10) Patent No.: US 10,015,232 B2
(45) Date of Patent: Jul. 3, 2018

(54) SYSTEMS AND METHODS FOR TRANSMITTING IMAGES

(71) Applicant: VMware, Inc., Palo Alto, CA (US)

(72) Inventor: Jonathan Clark, Palo Alto, CA (US)

(73) Assignee: VMware, Inc., Palo Alto, CA (US)

(*) Notice: Subject to any disclaimer, the term of this patent is extended or adjusted under 35 U.S.C. 154(b) by 393 days.

(21) Appl. No.: 13/905,018

(22) Filed: May 29, 2013

(65) Prior Publication Data
US 2014/0359055 A1    Dec. 4, 2014

(51) Int. Cl.
  *G06F 15/16*   (2006.01)
  *H04L 29/08*   (2006.01)
  *H04L 12/18*   (2006.01)
  *H04N 21/2225* (2011.01)

(52) U.S. Cl.
  CPC .......... *H04L 67/10* (2013.01); *H04L 12/1822* (2013.01); *H04L 67/02* (2013.01); *H04L 67/2833* (2013.01); *H04N 21/2225* (2013.01)

(58) Field of Classification Search
  CPC ........ H04L 67/10; H04L 29/08; G06F 3/0481
  USPC .......................................... 709/217; 715/740
  See application file for complete search history.

(56) References Cited

U.S. PATENT DOCUMENTS

| | | | |
|---|---|---|---|
| 7,636,500 B1* | 12/2009 | Arant | G06Q 30/06 382/305 |
| 2003/0149977 A1* | 8/2003 | Kataria | H04N 5/44504 725/37 |
| 2006/0168160 A1* | 7/2006 | Pratt | 709/220 |
| 2008/0147617 A1* | 6/2008 | Kumar | G06F 17/30864 |
| 2011/0119386 A1* | 5/2011 | Murrett | H04L 65/1069 709/227 |
| 2011/0224811 A1* | 9/2011 | Lauwers | G06F 3/16 700/94 |
| 2012/0246339 A1* | 9/2012 | Huang | H04L 49/557 709/239 |
| 2012/0304234 A1* | 11/2012 | Carbunar | H04N 21/2225 725/93 |
| 2013/0166767 A1* | 6/2013 | Olivier | H04L 65/60 709/231 |
| 2014/0003242 A1* | 1/2014 | Nadas et al. | 370/235 |
| 2014/0012997 A1* | 1/2014 | Erbe | 709/228 |
| 2014/0028685 A1* | 1/2014 | Weskamp | G06F 3/0481 345/473 |
| 2014/0149596 A1* | 5/2014 | Emerson, III | H04L 67/10 709/231 |

* cited by examiner

*Primary Examiner* — Philip Chea
*Assistant Examiner* — Mohammed Ahmed

(57) ABSTRACT

A plurality of web requests for images are received from a web client via corresponding web request channels. A response to a first one of the web requests is suppressed until a first generated image is received by the web server. The first web request is associated to the first generated image, which is then transmitted to the web client as a response to the first web request via the corresponding web request channels. A second received generated image is transmitted to the web client via a control channel based on a detection of a triggering event.

22 Claims, 2 Drawing Sheets

SYSTEMS AND METHODS FOR TRANSMITTING IMAGES

BACKGROUND

At least some known systems, such as computing systems, include browsers that support various mechanisms for receiving a continuous stream of image data from a server. For example, in a virtual desktop infrastructure (VDI), a virtual desktop may be accessible by one or more remote clients through a network and a web server may be used to provide various image data from the virtual desktop to one or more remote clients. More specifically, each remote client may include a browser or a web client that supports various methods for receiving a continuous stream of image data from the web server.

One known method that a web client supports to receive image data from the web server includes creating individual image objects, such as JAVASCRIPT image objects, and specifying an image source using a remote uniform resource locator (URL) to reference an image located on the web server. With this approach, the web client will establish a hypertext transfer protocol (HTTP) GET request to the web server and retrieve a binary file that represents an image, such as a joint photographic experts group (JPEG) or portable network graphics (PNG) file. However, this approach results in a latency overhead as multiple GET requests must be made in succession to retrieve all of the images associated with a remote desktop. For example, if the latency between the web client and the web server is 50 ms, then 100 ms is consumed from the full round trip that occurs when retrieving the image data. A second method that can be used with a relatively lower latency is to push image data from the web server to the web client by an HTTP XHR request using a keep-alive and a chunked-encoding mechanism, such as COMET. The second method reduces the latency overhead required to push data from the web server to the web client by eliminating the need for a client request. However, in this approach, image data is delivered to the web client in a text base64 format that incurs additional encoding and decoding latency on both ends and results in an increase in bandwidth consumption. While the impact of the increased bandwidth may be mitigated through the use of deflate compression, such an approach adds some latency for encoding and decoding for deflate compression.

Another method of transmitting image data to clients involves the use of websockets in a similar fashion to COMET. However, websockets are not as widely available and most websockets implementations do not support deflate compression. While websockets may be used to deliver binary image data to the web client, the web client may be required to convert binary image data to base64 before instantiating an image object. Because this conversion process happens in JAVASCRIPT, the added processing delay can be very significant. Accordingly, there is a need for cross-platform systems and methods for transmitting image data to web clients with a substantially reduced latency and, wherein the systems and methods have a substantially low impact on bandwidth consumption.

SUMMARY

Systems and methods described herein facilitate transmitting image data such that a load on a host and/or a remote terminal is substantially reduced. A remote terminal includes a web client that is in communication with a web server via a control channel and one or more web request channels. The web server is configured to receive one or more web requests from the web client, wherein at least one of the web request(s) corresponds to a request for an image. The web server is also configured to suppress a response to the web request(s) until one or more generated images have been received by the web server. The web server is configured to associate the request for the image to one generated image of the generated images. The web server is further configured to transmit the generated image that is associated with the request for the image to the web client via one of the web request channels. In addition, the web server is configured to transmit the generated image(s) via the control channel based on a detection of a triggering event.

DETAILED DESCRIPTION

Figure 1:
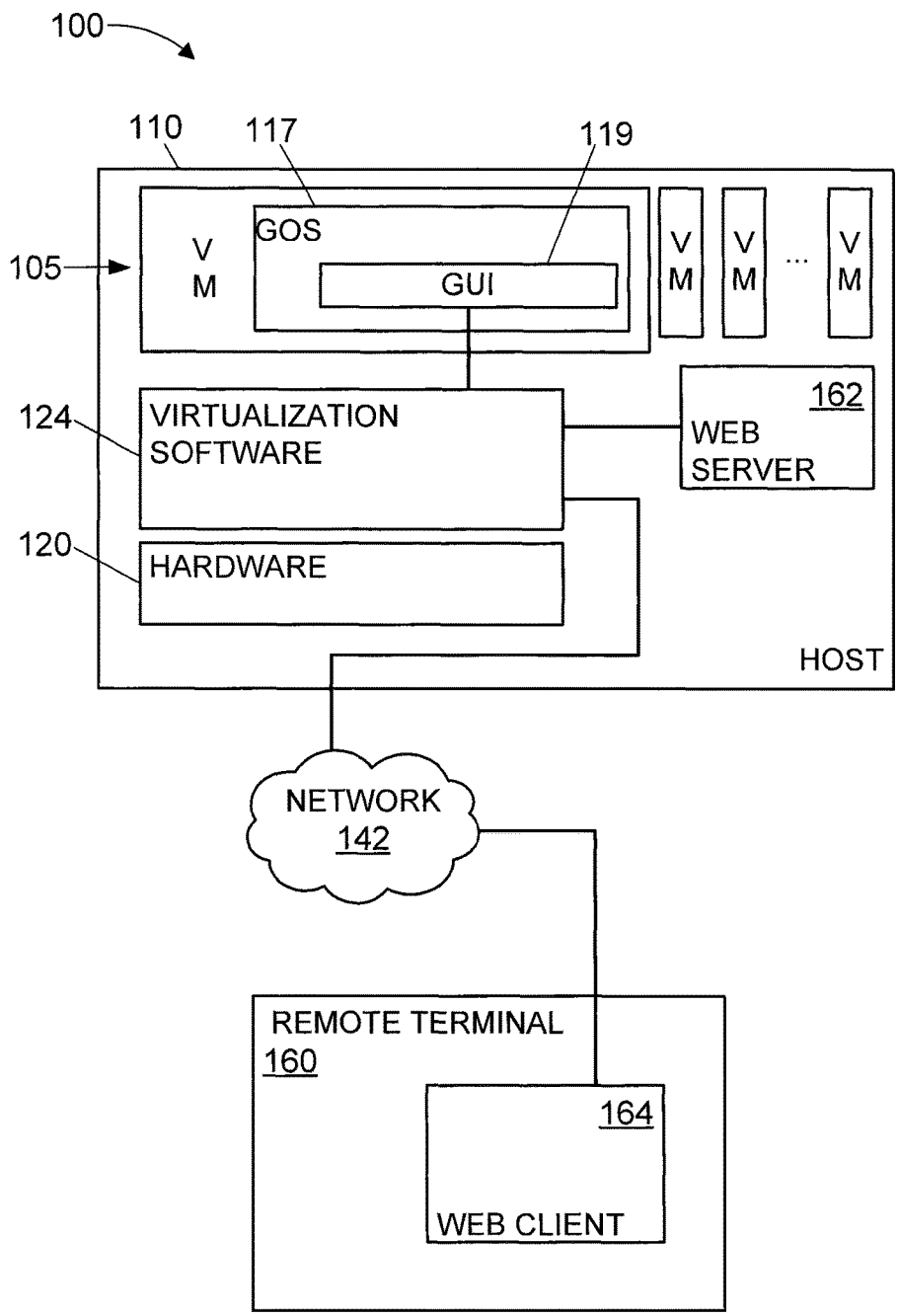
FIG. 1 is a block diagram of an exemplary system having a web server in communication with a web client.

FIG. 1 is an exemplary system 100, wherein system 100 is a virtual desktop infrastructure (VDI) system 100 having a plurality of virtual machines (VMs) 105 on a physical computer system or host 110. While system 100 is a VDI in the exemplary embodiment, system 100 is not limited to being a VDI. For example, system 100 may be a physical computing system having a physical desktop. In the exemplary embodiment, VDI system 100 has a plurality of virtual machines (VMs) 105 on a physical computer system or host 110. Host 110 includes hardware 120, a virtualization software, or manager, 124 running on hardware 120, and one or more VMs 105 executing on hardware 120 by way of virtualization software 124. Virtualization software 124 is therefore logically interposed between, and interfaces with, the hardware 120 and VMs 105. Virtualization software 124 may be implemented by storing in machine readable media instructions for execution in a processor, or directly in the hardware, e.g., as a system-on-a-chip, firmware, FPGA, etc. In one embodiment, hardware 120 includes at least one processor (not shown), wherein each processor is an execution unit, or "core," on a microprocessor chip. Hardware 120 also includes a system memory (not shown), which may include general volatile random access memory (RAM), a network interface port (NIC), and other devices (not shown).

Virtualization software 124 is sometimes referred to as a hypervisor, and includes software components for managing hardware resources and software components for virtualizing or emulating physical devices to provide virtual devices, such as virtual disks, virtual processors, virtual network interfaces, etc., for each VM 105. Each VM 105 is an abstraction of a physical computer system and may include a guest operating system (GOS) 117, which may be a commodity operating system such as Microsoft Windows®, and application software, which are referred to as the "guest OS" and "guest applications," respectively, wherein the term "guest" indicates it is a software entity that resides within the VM. Windows is a registered trademark of Microsoft Corporation.

In the exemplary embodiment, an end user of VMs 105 connects to, and interacts with, at least one of VMs 105 using a remote terminal 160 that is capable of communicating with host 110 via a network 142, which may be the Internet, a LAN, a WAN, or any combination thereof.

Remote terminal 160 may be a desktop computer, laptop, mobile device, thin client, or other similar device. Remote terminal 160 is capable of displaying the graphical user interface (GUI) generated by VM 105 to the end user using a computer display (not shown) or similar device. Remote terminal 160 is also capable of receiving user input from the end user and transmitting the received user input to guest OS 117 running inside VM 105.

Each VM 105 provides a virtual desktop to users of VMs 105. The desktop is an interactive user environment provided by guest OS 117 and guest applications (not shown) running within VM 105, and generally includes a graphical user interface GUI that may span one or more displays, which may be represented guest OS 117 by frame buffers, each of which stores pixel color values for each pixel for each output display. The desktop may include other outputs, such as audio, indicator lamps, tactile feedback, etc., and accepts input from the user in the form of device inputs, such as keyboard and mouse inputs. User inputs at remote terminal 160 may be converted to events that describe the user inputs, which are transmitted to an agent or virtual device for VM 105 and injected using system calls or virtual device interfaces in a manner known to those familiar with machine virtualization technology. In addition to user input/output, desktop 117 may send and receive device data, such as input/output for a FLASH memory device local to the remote user, or to a local printer. In the exemplary embodiment, GUI 119 may be presented to an end user on the computer display (not shown) of remote terminal 160.

In the exemplary embodiment, host 110 also includes a web server 162 (or other server) that is in communication with virtualization software 124 and/or each VM 105 and with remote terminal 160 via network 142. More specifically, web server 162 is configured to receive display updates from each, or one of, VMs 105 and transmit the display updates as images to web client 164 running on remote terminal 160 via communication channels (not separately shown). The display updates may include changes to GUI 119. As such, web server 162 is capable of transmitting both the images that include the display updates and instructions that enable web client 164 to arrange the images such that GUI 119 is displayed at remote terminal 160. In the exemplary embodiment, web server 162 is software that is configured to deliver content, including images, which can be accessed via network 142, by web client 164. U.S. Patent Application Publication 2012/0324358, published Dec. 20, 2012 and incorporated herein by reference in its entirety, describes in detail an exemplary protocol for remoting a GUI from a VM to a client web browser via HTTP. As explained in more detail below, in the exemplary embodiment, web server 162 is configured to transmit one or more images from one of VMs 105 to web client 164 via one or more web request channels by using a queue of blocking or suppressing image requests that are received from web client 164. Web server 162 is also configured to use a control channel to transmit images to web client 164 based on the detection of triggering events. Suppressed, or long-held, image requests, while also using the control channel, in addition to the web request channels to transmit images, help to overcome latencies caused by round trips associated with the use of request-response transactions, such as the GET method in HTTP.

In some implementations, web server 162 may be implemented using at least one of VMs 105, such that web server 162 executes inside a VM 105, such as by forming a component of an agent or background process such as a service or daemon (not shown) that executes on the VM containing the GUI being transmitted. However, it should be noted that web server 162 can be located anywhere, i.e., it can be located outside of the context of the VM as for which it is transmitting data or even on a separate physical computer as shown in FIG. 1, so long as it has access to GUI image data and can communicate with VM 105 or virtualization software 124. Hence, web server 162 may be running as a user process in conjunction with virtualization software 124, or within another VM running as a virtual appliance, or on a separate server device. Web client 164, in the exemplary embodiment, is a web browser that is configured to run on remote terminal 160 and connects to web server 162 as necessary to receive web content.

During operation of VDI system 100, one or more images corresponding to portions of GUI 119 are transmitted from web server 162 to web client 164 in a latency-efficient manner. An exemplary embodiment of a method for the transmission of the image(s) is described in detail with reference to FIG. 2 below. In general, web client 164 may establish a control channel (not separately shown) with web server 162, wherein the control channel facilitates communication between web client 164 and web server 162. The control channel may be a two-way HTTP connection such that web server 162 may transmit information regarding the web content to web client 164. For example, the information may include data about images that web client 164 receives from web server 162, such as instructions or metadata about the images.

At about the same time, web client 164 may also transmit one or more web requests, such as a GET request, to web server 162 via one or more web request channels (not shown), wherein at least one of the web request(s) corresponds to a request for an image. For example, web client 164 creates an image object such that the image object corresponds to a web request. Web client 164 may then transmit the web request to web server 162. Rather than immediately responding to the web request, web server 162 may block or suppress the web request until one or more generated images are received from the VM 105 being accessed by web client 164. More specifically, in the exemplary embodiment, web server 162 suppresses a response to the web request until a corresponding image is generated or obtained by web server 162. In the exemplary embodiment, the generated image may be a portion of GUI 119 that is generated by guest OS 117. Upon receiving the generated image, web server 162 can then associate the web request to the generated image. Web server 162 then transmits the generated image to web client 164 via the previously established corresponding web request channel.

Upon receiving the generated image, web client 164 is able to the display the image on the computer display (not shown) of remote terminal 160. More specifically, in the exemplary embodiment, the created image object receives the generated image data. The generated image may then be positioned within a display region of the computer display based on information received from web server 162. For example, web client 164 may receive data about the generated image, such as positional data, from web server 162 via the control channel. Web client 164 may receive the data simultaneously with, before, or after web client 164 receives the generated image from web server 162. The generated image can then be positioned at a location within the display region designated by the positional data. U.S. Patent Application Publication 2013/0050253, published Feb. 28, 2013 and incorporated herein by reference, illustrates a method for compositing display update images using a browser. In some embodiments, web client 164 may receive information regarding the generated image from web server 162 prior to web client 164 receiving the generated image. For example, the created image object may be positioned within a predefined location within the display region based on the positional data that the web client 164 receives. The created image object can then receive the generated image at the designated location. In some embodiments, the generated image may need to be moved to another location within the display region. For example, web client 164 may receive additional positioning information about the generated image from web server 162 via the control channel, in which case, the generated image can be repositioned within the display region. Thus, web client 164 may receive both an image of a portion of virtual desktop 117 and information about where the image should be displayed or offset within the display frame when compositing the image with previously received images, such that GUI 117 may be displayed replicated by web client 164.

After receiving an image, web client 164 is configured to create a new image object and transmit a new web request. The URL associated with each web request may be unique such that web requests may be distinguished by web server 162. For example, a query string variable or file name in the URL may include a number that is incremented with each new web request. Web client 164 may use the keep-alive directive in order to re-use a web connection for subsequent web requests, or may establish a new connection for each web request. If a connection or request is broken or is timed out, web client 164 may generate a new image object or new web request.

When the generated image is positioned appropriately within the display region, the image can be displayed by remote terminal 160. Because web server 162 suppressed its response to the request by web client 164 until the generated image was obtained by web server 162, the load on host 110 and/or remote terminal 160 is substantially reduced. Moreover, the latency associated with establishing a connection to web server 162 and making a web request is reduced because web server 162 may transmit the image as soon as it is received by responding to one of the queued requests, rather than waiting for the web request.

Instead of transmitting just one web request that corresponds to a request for an image to web server 162, web client 164 may transmit multiple web requests. For example, web client 164 may create a first, second, and third image object that correspond to a first, second, and third web request, respectively. Web client 164 transmits the first, second, and third web requests to web server 164.

Web server 162 suppresses a response to each of the first, second, and third web requests until corresponding generated images are received from one or more of VMs 105. One or more of VMs 105, in the exemplary embodiment, may transmit the corresponding generated images to web server 162 in a sequence. For example, VM 105 may transmit to web server 162 a first generated image, a second generated image, and a third generated image in chronological order. Upon receiving each of the first, second, and third generated images in the sequence, web server 162 can then associate the first, second, and third web requests to each of the generated images such that each of the images can be transmitted to web client 164 based on the sequence. When web server 162 receives the first generated image, web server 162 can associate the first web request to the first generated image, and web server 162 can then transmit the first generated image to web client 164 in response to the first web request. Next, when web server 162 receives the second generated image, web server 162 can associate the second web request to the second generated image, and web server 162 then transmits the second generated image to web client 164 in response to the second web request. Finally, when web server 162 receives the third generated image, web server 162 can associate the third web request to the third generated images, and web server 162 then transmits the third generated image to web client 164 in response to the third web request. In another example, VM 105 may transmit each of the first, second, and third images to web server 162 at the same time. Upon receiving each of the first, second, and third generated images, web server 162 can then associate the first, second, and third web requests to each of the generated images. The first, second, and third generated images can then be transmitted to web client 164 at the same time. In other words, web server 162 is configured to use as many suppressed web requests as are available to synchronously or asynchronously transmit all available generated images. When generated images arrive at web server 162 faster than web server 162 is able to transmit the images to web client 164, web server 162 may use a queue to hold the images until a web request is received. Because the web client 164 is configured to transmit a new web request after receiving an image, web server 162 may remove images from the queue and transmit the images using the first available web request.

Upon receiving the first, second, and third generated images, web client 164 is able to the display the images on the display of remote terminal 160. More specifically, the first, second, and third created image objects receive the corresponding first, second, and third generated images, and each of the generated images can then be positioned within a predefined location within a display region of the display based on information received from web server 162. For example, the first created image object receives the first generated image. Simultaneously with or shortly after receiving the first generated image, web client 164 may receive positional data about the first generated image from web server 162 via the control channel. Based on the positional data, the first generated image can be positioned in a first predefined location within the display region. The second created image object then receives the second generated image. Based on positional data that is also received for the second generated image, web client 164 is able to position the second generated image in a second predefined location within the display region. Lastly, the third created image object receives the third generated image. Based on positional data that is also received for the third generated image, web client 164 is able to position the third generated image in a third predefined location within the display region. When each of the generated images are positioned appropriately within the display region, the images can be displayed by remote terminal 160.

In the exemplary embodiment, web client 164 may timeout a web request for a web request channel after a specific amount of time has lapsed on web server 162 for a suppression of the web request. Web server 162 is able to respond with an error code on the web request channel that corresponds to a web request that has been suppressed for longer than, for example, 30 seconds. Such an error code may cause web client 164 to ignore the result and immediately establish a new connection or web request channel back to web server 162. As such, in addition to using the control channel to transmit information regarding the web content to web client 164, web server 162 may use the control channel to transmit images to web client 164 based on a detection of a triggering event. In one embodiment, a triggering event occurs when the web request channels are exhausted for a predefined period of time. For example, web client 164 detects when the queue of connections is temporarily exhausted. In another embodiment, a triggering event occurs when the size of a generated image is less than a predefined threshold value. For example, web client 164 detects the size of the image when the size is small enough such that the amount of bandwidth consumed from the web request and response headers is a large percentage of the bandwidth consumed. Accordingly, in addition to web server 162 being able to transmit images to web client 164 via the web request channels, web server 162 may also use the control channel to transmit images. This technique enables an efficient transfer of continuous streams of images from web server 162 to web client 164 such that a load on host 110 and/or remote terminal 160 is substantially reduced. For example, an overhead of base64 encode and/or decode may be inhibited and deflate compression can be used.

Figure 2:
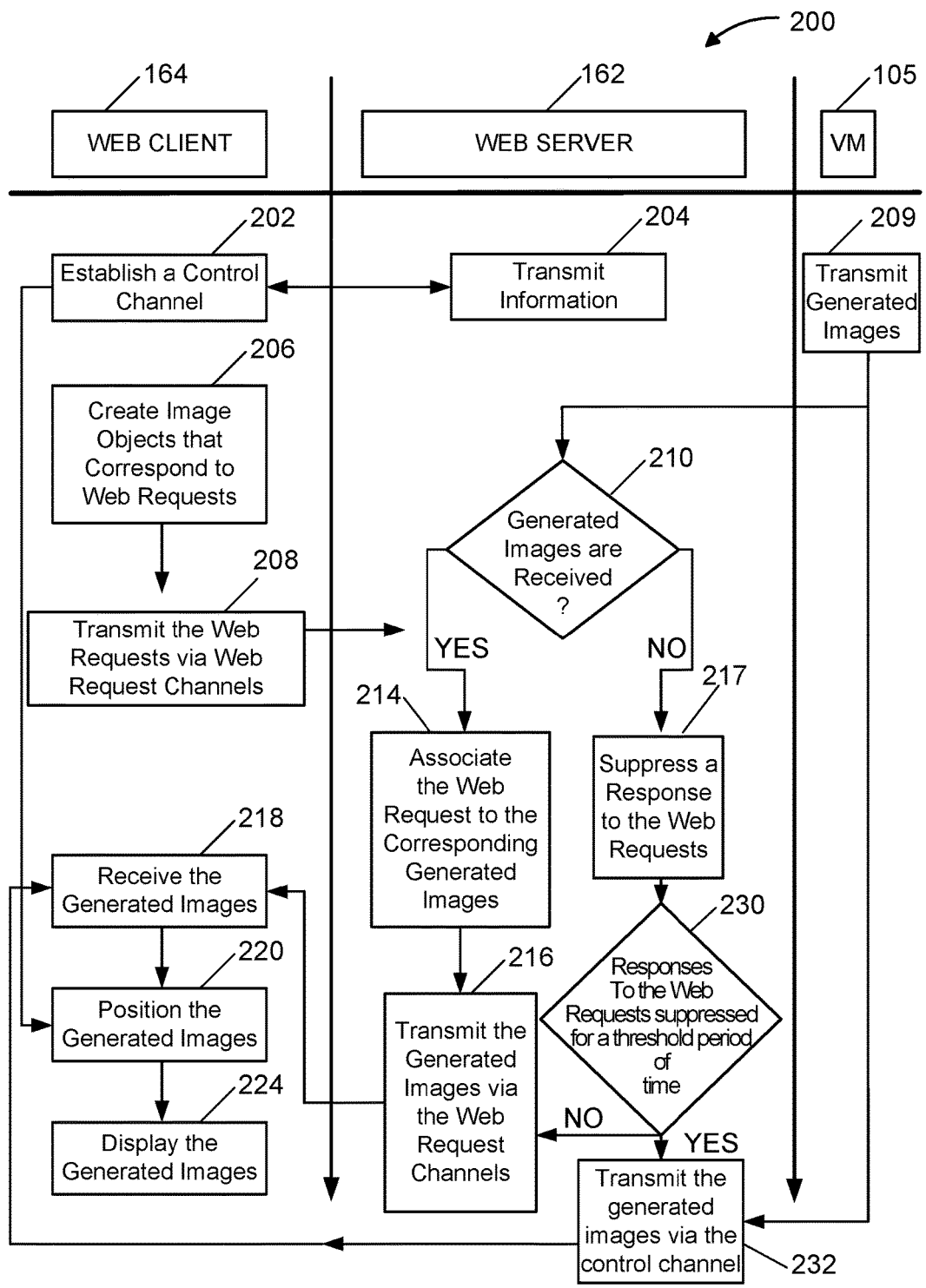
FIG. 2 is a swimlane diagram of an exemplary method for transmitting one or more images from the web server to the web client.

FIG. 2 is a swimlane diagram of an exemplary method 200 for transmitting one or more images from web server 162 located within host 110 (shown in FIG. 1) to web client 164 located within the remote terminal (shown in FIG. 1). Method 200 is embodied within a plurality of computer-executable instructions stored in one or more memories, such as one or more computer-readable storage mediums. The instructions are executed by one or more processors to perform the functions described herein.

In operation 202, web client 164 establishes a control channel (not shown) with web server 162 to facilitate communication between web client 164 and web server 162. For example, the control channel may be a two way HTTP connection to enable web server 162 to transmit information regarding web content to web client 164 in operation 204. For example, the information may include data about images that web client 164 receives from web server 162, such as instructions or metadata about the images.

In addition to establishing a control channel, web client 164 transmits one or more web requests, such as a GET request, to web server 162. First, in operation 206, web client 164 creates one or more image objects. More specifically, in the exemplary embodiment, web client 164 creates a first image object that corresponds to a first web request and a second image object that corresponds to a second web request. Moreover, in the exemplary embodiment, the first and second web requests correspond to a request for a first image and a request for a second image, respectively. Web client 164 transmits the web requests to web server 162 in operation 208 via one or more web request channels (not shown). More specifically, web client 164 transmits the first and second web requests to web server 162 simultaneously via a first and a second web request channel, respectively.

Rather than immediately responding to the web request, web server 162 may block or suppress a response to each of the first and second web requests if generated images are not available. VM 105 transmits generated images to the web server in operation 209, wherein the generated images correspond to display updates. More specifically, in the exemplary embodiment, VM 105 transmits a first generated image and a second generated image to web server 162, wherein the first and second generated images correspond to the first and second web requests, respectively. Moreover, the first and second generated images are transmitted to web server 162 in an order. If web server 162 has received the generated images that correspond to the web requests in operation 210, then web server 162 will associate the web requests to corresponding generated images in operation 214 and the generated images are transmitted to the web client in operation 216 via the corresponding web request channels.

If, however, the generated images have not been received, web server 162 suppresses, or continues to suppress, the web requests in operation 217. For example, if the first and second generated images have not been received, then web server 162 will suppress both the first and second web requests. When the first generated image has been received, web server 162 associates the first web request with the first generated image and transmits the first generated image to web client 164. At the same time, if the second generated image has still not been received, web server 162 will continue to suppress the second web request. When web server 162 receives the second generated image, then web server 162 will associate the second web request to the second generated image and transmit the second web request to web client 164.

The created image objects each receive the corresponding generated images in operation 218. For example, the first image object receives the first generated image and the second image object receives the second generated image. In operation 220, the generated images are each positioned in different predefined locations within a display region of a display (not shown) of remote terminal 160 based on information that web client 164 receives from web server 162 via the control channel. For example, web client 164 may receive positional data for the first generated image at the same time or shortly after the first generated image is received, and the first generated image is positioned in a first location of the display region based on the data. Similarly, web client 164 may receive positional data for the second generated image at the same time or shortly after the second generated image is received, and the second generated image is positioned in a second location of the display region based on the data. When the first and second generated images are positioned appropriately, the images can then be displayed, in operation 224, to an end use of remote terminal 160.

In the exemplary embodiment, web server 162 may use the control channel to transmit images to web client 164 based on the detection of a triggering event. For example, in operation 230, web server 162 detects whether any of the web requests have been suppressed for a threshold period of time, such as 30 seconds or more. If the web request has not been suppressed for more than the threshold period of the time when the generated image has been received, then the generated image is transmitted via the corresponding web request channel, as previously described for operation 216. If, however, the web request has been suppressed for the threshold period of time or longer, then web server 162 transmits the generated image to web client 164 via the control channel in operation 232. The control channel may also be used when the queue of web requests is temporarily exhausted. That is, when generated images are received faster than web requests with which to match them up. Similarly, web server 162 may transmit generated images that have a size that is equal to or smaller than a predefined threshold value to web client 164 via the control channel. Being able to use the control channel in addition to the web request channels to transmit images enables an efficient transfer of continuous streams of images from web server 162 to web client 164 such that a load on host 110 and/or remote terminal 160 is substantially reduced.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system--computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system comprising a web server configured to receive display updates for a graphical user interface (GUI) of a virtual desktop from a virtual machine (VM) and transmit the received display updates to a remote web client via a control channel and a plurality of web request channels wherein said system comprises at least one processor and memory including instructions that, when executed by the at least one processor, cause the system to:

execute the VM providing the virtual desktop by way of virtualization software that provides a virtualized computer environment by emulating system hardware for the VM, the virtual desktop being an interactive user environment provided by a guest operating system and guest applications running within the VM, wherein user inputs to the virtual desktop received at the web client are transmitted to the VM and inputted into the guest operating system inside the VM, causing display updates to the GUI of the virtual desktop;

receive, at the web server, a plurality of web requests for images that comprise the display updates to the GUI of the virtual desktop from said web client via the web request channels;

determine whether a first generated image comprising a first display update to the GUI of the virtual desktop corresponding to a first one of the web requests is available at the web server and, if the first generated image comprising the first display update is not available, then suppress a response to the first one of the web requests until the first generated image comprising the first display update is received by the web server from the VM;

associate the first one of the web requests to the first generated image comprising the first display update;

transmit the first generated image comprising the first display update to the web client as a response to the first one of the web requests via a corresponding one of the web request channels; and transmit a second received generated image comprising a second display update to the GUI of the virtual desktop to the web client via the control channel based on a detection of a triggering event.

2. The system of claim 1, wherein the memory further includes instructions that when executed by the at least one processor, cause the web server to:

receive additional first, a second, and a third web request from the web client, wherein the first, second, and third web requests corresponds to a first, a second, and a third request for an image; and suppress a response to each of the additional first, second, and third web requests until at least one of additional first, second, and third generated images has been received by the web server.

3. The system of claim 2, wherein memory further includes instructions that when executed by the at least one processor, cause the web server to:
receive the additional first, second, and third generated images in a sequence;
associate the additional first, second, and third web requests to the additional first, second, and third generated images; and
transmit the additional first, second, and third generated images to said web client as responses to the additional first, second, and third web requests.

4. The system of claim 1, wherein the memory further includes instructions that when executed by the at least one processor, cause the web server to transmit to the web client informational data regarding the generated images from said web server via the control channel.

5. The system of claim 4, wherein the informational data designates an offset position within a display frame for compositing the generated image with previously transmitted images.

6. The system of claim 1, wherein the triggering event is when the web requests channels are exhausted.

7. The system of claim 1, wherein the triggering event is when the size of a received generated images is smaller than a predefined threshold size.

8. The system of claim 1, wherein the triggering event occurs when a web request is suppressed longer than a threshold period of time.

9. At least one non-transitory computer-readable storage medium having computer-executable instructions embodied thereon for receiving at a web server display updates for a graphical user interface (GUI) of a virtual desktop from a virtual machine (VM) and transmitting the received display updates to a remote web client, wherein, when executed by at least one processor, the computer-executable instructions cause the at least one processor to:
execute a virtual machine (VM) providing the virtual desktop by way of virtualization software that provides a virtualized computer environment by emulating system hardware for the VM, the virtual desktop being an interactive user environment provided by a guest operating system and guest applications running within the VM, wherein user inputs to the virtual desktop received at the web client are transmitted to the VM and inputted into the guest operating system inside the VM, causing display updates to the GUI of the virtual desktop;
receive, at the web server, a plurality of web requests for images that comprise the display updates to the GUI of the virtual desktop from the web client via a corresponding plurality of web request channels;
determine whether a first generated image comprising a first display update to the GUI of the virtual desktop corresponding to a first one of the web requests is available at the web server and, if the first generated image comprising the first display update is not available, then suppress a response to the first one of the web requests until the first generated image comprising the first display update is received from the VM;
associate the first one of the web requests to the first generated image comprising the first display update;
transmit the first generated image comprising the first display update to the web client as a response to the first one of the web requests via the corresponding one of the web request channels; and
transmit a second received generated image comprising a second display update to the GUI of the virtual desktop to the web client via a control channel based on a detection of a triggering event.

10. The at least one non-transitory computer-readable storage medium of claim 9, wherein the computer-executable instructions further cause the at least one processor to:
receive additional first, a second, and a third web request from the web client, wherein the first, second, and third web requests corresponds to a first, a second, and a third request for an image; and
suppress a response to each of the additional first, second, and third web requests until at least one of additional first, second, and third generated image has been received.

11. The at least one non-transitory computer-readable storage medium of claim 10, wherein the computer-executable instructions further cause the at least one processor to:
receive the additional first, second, and third generated images in a sequence;
associate the additional first, second, and third web requests to the additional first, second, and third generated images; and
transmit the additional first, second, and third generated images to the web client as responses to the additional first, second, and third web requests.

12. The at least one non-transitory computer-readable storage medium of claim 9, wherein the computer-executable instructions further cause the at least one processor to transmit informational data regarding the one or more generated images to the web client via the control channel.

13. The at least one non-transitory computer-readable storage medium of claim 8, wherein the informational data designates an offset position within a display frame for compositing the generated image with previously transmitted images.

14. The at least one non-transitory computer-readable storage medium of claim 9, wherein the triggering event is when the one or more web request channels are exhausted.

15. The at least one non-transitory computer-readable storage medium of claim 9, wherein the triggering event is when the size of the one or more generated images is smaller than a predefined threshold size.

16. The at least one non-transitory computer readable storage medium of claim 9, wherein the triggering event occurs when a web request is suppressed longer than a threshold period of time.

17. A method for receiving at a web server display updates for a graphical user interface (GUI) of a virtual desktop from a virtual machine (VM) and transmitting the received display updates to a remote web client, said method comprising:
executing a virtual machine (VM) providing the virtual desktop by way of virtualization software that provides a virtualized computer environment by emulating system hardware for the VM, the virtual desktop being an interactive user environment provided by a guest operating system and guest applications running within the VM, wherein user inputs to the virtual desktop received at the web client are transmitted to the VM and inputted into the guest operating system inside the VM, causing display updates to the GUI of the virtual desktop;
receiving, at the web server, one or more web requests for images that comprise the display updates to the GUI of the virtual desktop from the web client via one or more web request channels;

determining whether a first generated image comprising a first display update to the GUI of the virtual desktop corresponding to a first one of the web requests is available at the web server and, if the first generated image comprising the first display update is not available, then suppressing a response to the first one of the web requests until the first generated image comprising the first display update is received from the VM;

associating the first one of the web requests to the first generated image comprising the first display update;

transmitting the first generated image comprising the first display update to the web client as a response to the first one of the web requests via a corresponding one of the web request channels; and transmitting a second received generated image comprising a second display update to the GUI of the virtual desktop to the web client via a control channel based on a detection of a triggering event.

18. The method of claim 17, further comprising transmitting to the web client informational data regarding the generated images via the control channel.

19. The method of claim 18, wherein the informational data designates an offset position within a display frame for compositing the generated image with previously transmitted images.

20. The method of claim 17, wherein the triggering event is when the web requests channels are exhausted.

21. The method of claim 17, wherein the triggering event is when the size of a received generated images is smaller than a predefined threshold size.

22. The method of claim 17, wherein the triggering event occurs when a web request is suppressed longer than a threshold period of time.

* * * * *